United States Patent
Campos

[15] 3,650,347
[45] Mar. 21, 1972

[54] AUTOMOBILE SAFETY AND ANTI-THEFT DEVICE

[72] Inventor: Adolph J. Campos, 905 McCarter Highway, Newark, N.J. 07102

[22] Filed: Oct. 3, 1969

[21] Appl. No.: 863,449

[52] U.S. Cl. ........................180/114, 70/238, 70/261, 180/104, 200/61.45, 296/65
[51] Int. Cl. ........................................B60r 25/10
[58] Field of Search............180/114, 82, 104; 296/65, 65 A; 70/238, 239, 261, DIG. 49; 200/61.45, 61.52; 74/515; 116/33

[56] References Cited

UNITED STATES PATENTS

| | | | |
|---|---|---|---|
| 704,616 | 7/1902 | Charles | 180/101 |
| 1,460,377 | 7/1923 | Hay | 116/33 |
| 1,518,770 | 12/1924 | Burrows | 180/101 X |
| 3,217,120 | 11/1965 | Bowen et al. | 200/61.52 |
| 3,490,255 | 1/1970 | Wight et al. | 70/252 |

FOREIGN PATENTS OR APPLICATIONS 428,246  5/1935  Great Britain..........................180/114

*Primary Examiner*—Benjamin Hersh
*Assistant Examiner*—John P. Silverstrim
*Attorney*—Berman, Davidson and Berman

[57] ABSTRACT

An automobile safety and anti-theft device consisting of a housing portion on a driver's seat located between the driver's thighs. The housing contains a normally closed switch with a transverse sliding operating bar projecting on opposite sides of the housing and being operatively engageable by the driver's thighs to open the switch responsive to excessive lurching of the driver's body. The switch is connected in the ignition circuit of the automobile. The housing also contains a tilt-responsive alarm switch connected in an alarm circuit to energize an alarm when the automobile is tilted for towing by an unauthorized person. Also contained in the housing is a key-operated seat lock to lock the driver's seat in a position too close to the steering wheel for a person to occupy the seat. Releasing the seat lock also de-activates the alarm switch.

4 Claims, 6 Drawing Figures

Patented March 21, 1972
3,650,347
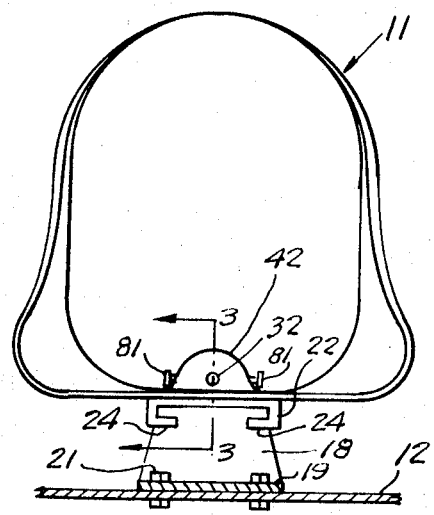
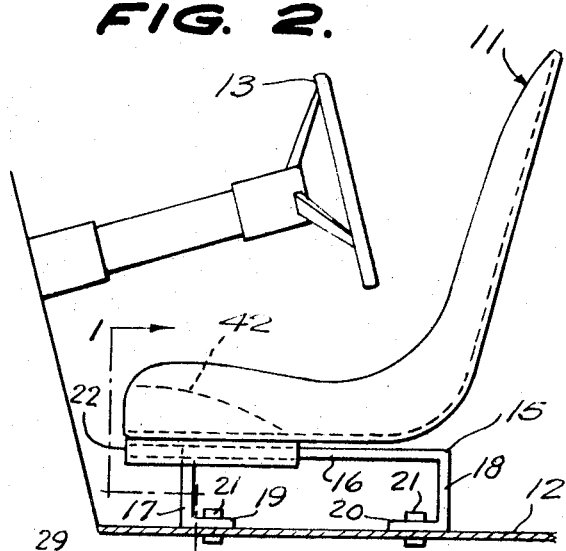
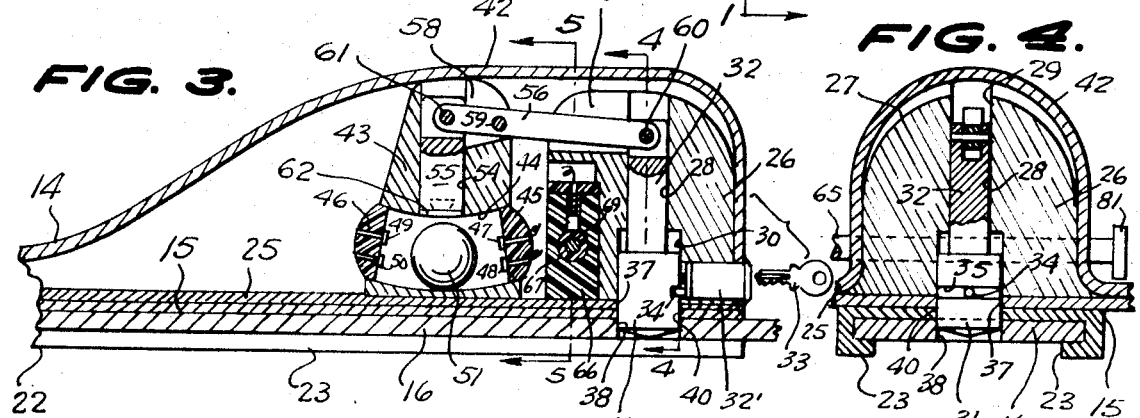
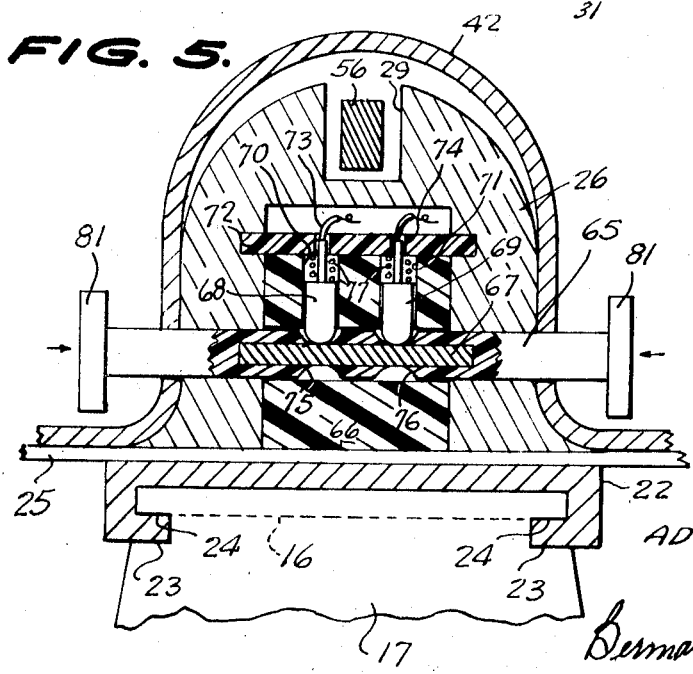
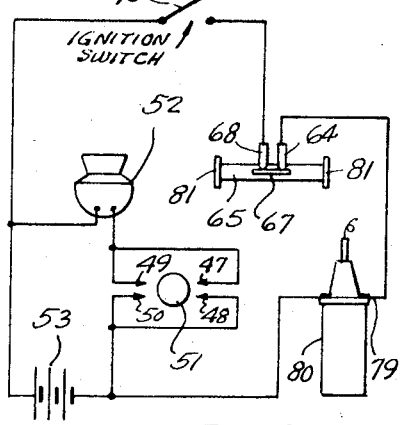
INVENTOR.
ADOLPH J. CAMPOS,
BY
Berman, Davidson & Berman,
ATTORNEYS.

AUTOMOBILE SAFETY AND ANTI-THEFT DEVICE

This invention relates to motor vehicle safety and anti-theft devices, and more particularly to an attachment adapted to be mounted on a vehicle seat and which responds to emergency conditions, such as excessive lurching of the driver's body, or unauthorized attempts to tow away the vehicle by an unauthorized person, the attachment being simple in construction, being easy to install, and being very effective in automatically responding to the emergency condition, either to stop the vehicle, or to energize an alarm device.

A further object of the invention is to provide an improved automobile safety and anti-theft device which can be employed as an attachment for the driver's seat of an automobile, the device being very compact in size, being inconspicuous in appearance and being inexpensive to manufacture.

A still further object of the invention is to provide an improved automobile safety and anti-theft attachment for the driver's seat of a motor vehicle, the attachment involving only a few parts, being durable in construction, and creating a minimum of discomfort to the driver.

A still further object of the invention is to provide an improved attachment for the driver's seat of an automobile which may be utilized either to automatically open the ignition circuit of the automobile responsive to excessive side-swaying or lurching of the vehicle, or may be utilized as a burglar alarm device, or as a device for locking the driver's seat in a position so close to the steering wheel of the vehicle that it is impossible for a person to sit behind the wheel.

Further objects and advantages of the invention will become apparent from the following description and claims, and from the accompanying drawing, wherein:

FIG. 1 is a front elevational view of a motor vehicle driver's seat equipped with an improved safety and anti-theft device in accordance with the present invention, said view being taken substantially on line 1—1 of FIG. 2.

FIG. 2 is a longitudinal vertical cross-sectional view taken through the automobile of FIG. 1, showing the driver's seat in side elevational view.

FIG. 3 is a longitudinal vertical cross-sectional view taken substantially on line 3—3 of FIG. 1.

FIG. 4 is a vertical cross-sectional view taken substantially on line 4—4 of FIG. 3.

FIG. 5 is an enlarged vertical cross-sectional view taken substantially on line 5—5 of FIG. 3.

FIG. 6 is a wiring diagram showing the electrical connections of the device of FIGS. 1 to 5 in relation to the vehicle battery and the vehicle ignition circuit.

Referring to the drawing, 11 generally designates the driver's seat of a motor vehicle, the seat 11 being mounted on the floor 12 of the vehicle rearwardly of the vehicle steering wheel 13, as shown in FIG. 2. The seat 11 comprises a suitable frame of generally conventional structure and is provided with a covering layer of suitable durable material, shown at 14. The seat 11 is adjustably supported on a bracket, shown generally at 15, which is secured to the floor 12, rising therefrom and extending longitudinally thereof. The bracket 15 comprises the longitudinally extending top bar 16 and the downwardly flaring front and rear legs 17 and 18, said legs being provided with inturned bottom flanges 19 and 20 which are secured to the floor 12 by means of suitable bolts 21 or similar fastenings, said fastenings passing through apertures provided in the flanges 19 and 20 and through the floor 12.

Rigidly secured to the bottom of seat 11 at its forward mid-portion is a longitudinally extending channel member 22 which faces downwardly and which is provided with the turned bottom flange portions 23, 23, the bar member 16 being slidably engageable in the channel member 22 and the front leg 17 being formed with notches 24, 24 to slidably receive the inturned retaining flange elements 23, 23. Said flange elements 23, 23 engage beneath the side marginal portions of the longitudinal bar 16 and cooperate therewith to guide the seat 11 for longitudinal adjustments.

Conventional locking means, not shown, may be employed to lock the seat 11 in a selected position of longitudinal adjustment. However, as will be presently described, the seat 11 may be locked in an extreme forward position so close to the steering wheel 13 that it is impossible for a person to position himself in the seat.

As shown in FIGS. 3 and 4, the body of the seat 11 is provided with the horizontal rigid bottom plate 25. Suitably mounted on plate 25 at the mid-portion of the front margin thereof is a block 26 having a smoothly rounded top surface 27, the block being formed with the vertical bore 28 and with a longitudinal, rearwardly directed top groove 29 communicating with the top portion of the bore 28, as shown in FIG. 3. The bore 28 communicates with an enlarged bottom recess 30 in block 26 in which is slidably positioned a locking bolt 31 having the reduced vertical shaft portion 32 which slidably engages in the bore 28. A conventional rotary-barrel lock assembly 32' is mounted in the block 26 and is provided with a key-receiving front portion which extends through the front face of the covering layer 14, being thereby exposed and being adapted to receive a suitable key 33. The rotary-barrel portion of the lock assembly 32' is provided with a rearwardly projecting drive pin 34 which slidably engages in the horizontal groove 35 formed in the locking bolt 31 whereby the locking bolt may be raised and lowered responsive to rotation of the barrel member of the lock assembly 32' by the operating key 33. Thus, the bolt member 31 may be received in a pair of registering apertures 37 and 38 provided in plate 25 and bar 16 and being located so as to register when the seat 11 is moved to the above described extreme forward position, whereby the bolt 31 may be employed to lock the seat in said extreme forward position. The member member 31 may be elevated from this locking position by employing the key 33 to cause pin 34 to rotate in a direction to raise bolt 31 out of the lower aperture 18, whereby to allow the seat to be moved rearwardly.

The top wall of channel member 22 is provided with an aperture 40 which is in registry with and is similar in size and shape with the aperture 37 of plate 25, and through which the bolt member 31 may slide.

As shown in FIG. 1, the outer wall covering 14 of the seat is conformably shaped to receive block 26 and parts associated therewith and thereby to define a bulge 42 located at the mid-portion of the front margin of the seat and which is adapted to be received between the occupant's thighs. Thus, the bulge 42 is longitudinally elongated and is smoothly curved to conform with the body contour of the occupant of the seat and is shaped so that it may comfortably be received between the occupant's thighs.

Secured on the plate 125 rearwardly and in longitudinal alignment with the block 26 is another upstanding block 43. The lower portion of block 43 is formed with a longitudinally extending arcuate bore 44 provided with the respective front and rear cover plugs 45 and 46 of insulating material. Plug 45 is provided with a pair of spaced inwardly exposed contact terminals 47 and 48 and plug 46 is similarly provided with a pair of spaced inwardly facing contact terminals 49 and 50. Located in the arcuate bore 45 and being free to roll therein is a metal ball 51 which normally assumes a centered position in the bore, namely, normally rests in the intermediate lower portion of the bore, as shown in FIG. 3.

The ball 51 will normally remain substantially in its centered position, shown in FIG. 3, as long as the associated vehicle is not excessively inclined longitudinally. However, if the vehicle becomes excessively inclined, for example, by having either its forward or rear end elevated by a jack or by a tow away truck, as might occur when the vehicle is towed away, the ball 51 will roll into contact and bridge either the pairs of contacts 49, 50 or 47, 48, depending upon whether the front end of the vehicle or the rear end of the vehicle is elevated.

As shown in FIG. 6, the respective pairs of contacts 49, 50 and 47, 48 are connected in a parallel configuration and are connected in an alarm circuit including an alarm horn 52 and the vehicle battery 53. Thus, the alarm horn 52 becomes energized when the ball 51 bridges either the contacts 49,50 or 47,48. Accordingly, the alarm circuit operates to provide a loud audible alarm when an unauthorized person attempts to tow the vehicle away, using a tow truck, or a similar towing vehicle.

As shown in FIG. 3, the block 43 is provided with a vertical bore 54 in which is slidably mounted a plunger 55. A lever 56 is pivoted in a notch 58 in the top portion of block 43, by means of a transverse pivot pin 59, the lever 56 extending through the groove 29 and being pivotally connected at 60 to the top end of the vertical plunger member 32. The left-end portion of lever 56, as viewed in FIG. 3, is pivoted at 61 to the top end of the plunger 55. Thus, when the lock bolt 31 is elevated to seat-releasing position by means of the key 33, as above explained, the lever 56 is rotated in a counterclockwise direction, as viewed in FIG. 3, and the plunger member 55 is moved downwardly to clampingly engage the ball 51 and to lock the ball against rotation. Thus, when the authorized operator of the vehicle adjusts the seat 11 by moving it rearwardly, the ball 51 is locked in inoperative position by the action of the plunger 55. The plunger 55 is provided at its bottom end with a rubber friction pad 62 which clampingly engages ball 51 when plunger 55 is moved downwardly, in the manner above described.

It will thus be apparent that when the authorized operator of the vehicle releases the seat 11 and adjusts it to proper driving position, the alarm circuit, above described, is automatically rendered inoperative, since the ball 51 is then locked in a stationary position in the arcuate bore 44.

With the seat 11 locked in its forward position by the action of the locking bolt 31, above described, the ball 51 is free to roll in the arcuate bore 44 and the theft-alarm circuit, above described, will then be operative.

Designated at 65 is transverse horizontal rod member of insulating material which is slidably mounted in an insulating block 66 secured in the rear portion of the upstanding main block 26. Molded axially in the mid-portion of rod 65 is a metal insert rod 67. A pair of contact plunger members of conductive material, shown at 68 and 69, are slidably mounted in respective bores 70 and 71 provided in the upper portion of block 66. A top cover plate 72 of insulating material is secured in main block 26 over insulating block 66 and is apertured to receive the reduced stem portions 73 and 74 of the plunger elements 68 and 69. Respective coil springs 77,77 surround the stem portions 73 and 74 beneath cover plate 72 and bias the contact plunger members 68 and 69 downwardly to engage in annular recesses 75 and 76 formed in the rod 65, said annular recesses exposing the conductive inner rod 67, so that normally the plunger members 68 and 69 make bridging contact with rod 67. As shown in FIG. 6, contacts 68, 69 and rod 67 are connected in series with the vehicle ignition switch 78 between the positive terminal of vehicle battery 53 and the "barttery" terminal 79 of the low-tension side of the vehicle ignition coil 80.

The laterally projecting opposite ends of the transverse rod 65 are provided with respective enlarged head portions 81,81 which are engageable with the operator's thighs. Under normal conditions, the rod 65 remains in a substantially centered position shown in FIG. 5. However, if the vehicle makes an excessively sharp turn or skids sharply to the side, or otherwise causes the operator's body to lurch in a lateral direction either to one side or the other, the rod 65 will be shifted, with sufficient force exerted thereon to overcome the biasing effect of springs 77,77 whereby plunger elements 68,69 will be disengaged from the conductive rod 67, opening the ignition circuit and causing the vehicle engine to become inoperative.

It will thus be seen that during operation of the vehicle any condition that causes excessive lurching thereof, which thereby causes the operator's body to shift laterally to an excessive degree will automatically open the ignition circuit by the action of the operator's thighs on the shiftable rod 65. Minor lateral movement of the vehicle will not affect its operation, since a substantial amount of lateral force is required to shift the rod 65 against the biasing force of the coil springs 77, which tend to maintain the contact plungers 68,69 in the annular grooves 75, 76.

It will thus be seen that if the vehicle makes an excessively sharp turn at high speed, the inertia of the operator's body will cause sufficient force to be exerted on the rod 65 to open the ignition circuit. The same will occur when, for any other reason, the vehicle lurches, or any other condition arises causing the operator's body to shift suddenly in a lateral direction.

As will be readily understood from the above discussion, in using the device, the seat 11 is moved forwardly toward the steering wheel 13 when the operator leaves the vehicle and is locked in a forward position sufficiently close to the steering wheel 13 as to prevent a person from occupying the seat, in accordance with the location of the locking aperture 38. Thus, in said forward position the bolt 31 may be moved into the locking aperture, as above explained, thereby locking the seat in this position. The movement of the bolt member 31 is accomplished by means of the key 33, whereby with the key inserted in the lock barrel 32', rotation of the key causes the pin 34 to cam the bolt member 31 downwardly into the aperture 38. At the same time, the clamping plunger 55 is elevated, releasing the ball 51. The ball 51 is thereafter free to roll in the arcuate conduit chamber 44, so that it acts as a gravity switch in conjunction with the spaced contacts 49,50 or 47,48, responding to attempts to tilt the vehicle and thereby energizes the alarm device 52.

When the operator returns to the vehicle he can release the seat 11 by means of the key 33, whereby operation of the key in the lock barrel 32' elevates the bolt member 31 and allows the seat to be moved rearwardly toward a suitable position wherein the driver may occupy same. As the bolt member 31 is elevated to release position relative to the aperture 38, the clamping plunger 55 is moved downwardly causing its resilient rubber pad element 62 to clampingly engage the ball 51 and lock it in a fixed position in the arcuate conduit passage 44. Thus, the tilt-responsive alarm means is rendered inoperative responsive to the operation of the bolt-elevating means, namely, the key-operated lock barrel 32'.

As above explained during normal operation of the vehicle, the transverse movable rod member 65 is located between the operator's thighs, and any excessive lurching movement of the operator's body will thereby cause the rod member 65 to be displaced longitudinally and to open the ignition circuit by the disengagement of the conductive core 67 from the spaced contact members 68 and 69.

The opening of the ignition circuit renders the engine inoperative, which immediately provides a braking action, acting to slow down the vehicle.

While a specific embodiment of an improved automobile safety and anti-theft device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle including a rearwardly projecting steering wheel column provided with a steering wheel, longitudinally extending support means subjacent the steering wheel, an operator's seat slidably mounted on said support means and being movable thereon to a forward position sufficiently close to the steering wheel as to prevent a person from occupying the seat, means to lock the seat in said forward position, means to disengage said locking means, tilt-responsive alarm means on the vehicle, and means to render said tilt-responsive alarm means inoperative responsive to the operation of said disengaging means, wherein said seat including an upstanding housing portion located at the intermediate portion of the forward margin of the seat, said locking means being at least in part located in said housing portion, wherein said tilt-responsive alarm means includes a gravity switch assembly in said housing portion including at least one pair of spaced stationary contacts and a tilt-responsive movable rigid conductive member engageable with said contacts when the vehicle is tilted, wherein the means to render the alarm means inoperative comprises a clamping element engageable with said conductive member and means to move said clamping element into engagement with the conductive member responsive to the operation of said disengaging means, wherein said gravity switch assembly comprises means defining a longitudinal arcuate upwardly concave conduit and said conductive member comprises a metal ball disposed for rolling movement in said conduit, said spaced contacts being spaced from the lowest portion of the conduit, wherein said clamping element comprises a vertically movable plunger located above said lowest portion and wherein the means to move the clamping element into engagement with the ball comprises link means interconnecting the plunger and the seat-locking means, and wherein the means defining said arcuate conduit comprises a block formed with a longitudinal arcuate upwardly concave bore, said ball being disposed in said bore, said block being formed with a vertical bore located above the lowest portion of the arcuate bore, said plunger being slidably mounted in said vertical bore.

2. The motor vehicle of claim 1, and wherein said link means comprises an arm pivotally to said block and connected respectively at its opposite ends to said plunger and to said locking means.

3. The motor vehicle of claim 1, and wherein said locking means comprises a vertically movable bolt member, said support means being formed with a locking aperture located to receive said bolt member when the seat is in said forward position.

4. The motor vehicle of claim 3, and wherein said upstanding housing portion includes a further block located adjacent the forward edge of the seat, said further block being formed with a vertical bore i in which said bolt member is slidably mounted, and key-operated means operatively coupled to said bolt member and having a key-receiving opening exposed at the forward edge of the seat.

* * * * *